United States Patent
Herrod et al.

(10) Patent No.: US 6,826,756 B1
(45) Date of Patent: Nov. 30, 2004

(54) AUTOMATIC TRANSFER OF DATA FROM AN INPUT DEVICE TO A SOFTWARE APPLICATION

(75) Inventors: Allan Herrod, Farmingville, NY (US); James R. Fuccello, Patchogue, NY (US); Donald E. Schafer, Wantagh, NY (US); Joseph Cabana, Centereach, NY (US); Thomas E. Lackemann, Sayville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 09/107,237

(22) Filed: Jun. 30, 1998

(51) Int. Cl.[7] .................................................. G06F 9/00
(52) U.S. Cl. ...................................................... 719/310
(58) Field of Search ................................ 709/321, 201; 235/442; 345/168; 719/310, 313, 321, 328

(56) References Cited

U.S. PATENT DOCUMENTS

| | | | |
|---|---|---|---|
| 5,029,183 A | 7/1991 | Tymes ............................ 375/1 |
| 5,119,479 A * | 6/1992 | Arai et al. .................... 395/275 |
| 5,170,252 A | 12/1992 | Gear et al. ................... 358/181 |
| 5,233,686 A * | 8/1993 | Rickenbach et al. ......... 395/158 |
| 5,280,498 A | 1/1994 | Tymes et al. .................... 375/1 |
| 5,288,976 A * | 2/1994 | Citron et al. ................. 235/375 |
| 5,483,052 A * | 1/1996 | Smith et al. ............ 235/462.49 |
| 5,528,621 A | 6/1996 | Heiman et al. .............. 375/200 |
| 5,604,516 A * | 2/1997 | Herrod et al. ............... 345/168 |
| 5,634,058 A | 5/1997 | Allen et al. .................. 395/712 |
| 5,668,803 A | 9/1997 | Tymes et al. ................ 370/312 |
| 5,675,139 A | 10/1997 | Fama .......................... 235/472 |
| 5,682,534 A | 10/1997 | Kapoor et al. ............... 395/684 |
| 5,724,261 A * | 3/1998 | Denny et al. ................ 702/184 |
| 5,751,962 A | 5/1998 | Fanshier et al. ............. 395/200 |
| 5,777,580 A | 7/1998 | Janky et al. ................. 342/457 |
| 5,778,377 A | 7/1998 | Marlin et al. ............... 707/103 |
| 5,778,380 A | 7/1998 | Siefert ......................... 707/103 |
| 5,801,696 A * | 9/1998 | Roberts ....................... 345/340 |
| 5,832,458 A * | 11/1998 | Jones ........................... 705/14 |
| 5,911,044 A * | 6/1999 | Lo et al. ...................... 709/203 |
| 6,031,830 A | 2/2000 | Cowan ......................... 370/338 |
| 6,507,864 B1 * | 1/2003 | Klein et al. .................. 709/201 |

FOREIGN PATENT DOCUMENTS

| | | | |
|---|---|---|---|
| EP | 0 782 297 A2 | 7/1997 | ........... H04L/12/28 |
| EP | 0 837 406 A2 | 4/1998 | ........... G06F/17/30 |

* cited by examiner

*Primary Examiner*—S. Lao
(74) *Attorney, Agent, or Firm*—Sierra Patent Group, Ltd.

(57) ABSTRACT

In a computer system including a central processing unit and a transducer for providing data input to the system from a source having controllable operational features and parameters for adjusting characteristics of the data independently of the source and where the system's operating system manages data requests from an application program with one or more data entry fields and associated data entry criteria, a method for responding to a data request by the application program includes tagging the input data with an input source identification; packaging the data and the input source identification as a data module, the data module being associated with a predetermined data entry field in the application software; transferring the data module from the transducer to the application via the operating system; and associating the data module to one or more predetermined data entry fields of the application software based on the input source identification and the associated data entry criteria.

30 Claims, 17 Drawing Sheets

AUTOMATIC TRANSFER OF DATA FROM AN INPUT DEVICE TO A SOFTWARE APPLICATION

CROSS REFERENCE TO RELATED APPLICATION

This application is related to U.S. Pat. No. 6,237,053 B1, filed on the same day as this application, entitled "CONFIGURABLE OPERATING SYSTEM FOR I/O CONNECTIVITY".

BACKGROUND OF THE INVENTION

1. Field of the Invention

The present invention relates to a system for delivering data to an application software from a variety of input sources.

2. The Prior Art

Rapid advances in technology have given rise to inexpensive, yet powerful computers which are used in a number of applications, including data collection, inventory control, databases, word processors, and spreadsheets, among others. The applications usually execute software with a graphical user interface (GUI), which renders the application "user friendly." The GUI provides simple interactive tools for the input, manipulation and display of data as well as program execution control through windows, icons, menus, tool bars, scroll bars, command buttons, option buttons, text input boxes, dialog boxes and the like. Through the graphical user interface, a user or an operator can run the application software intuitively and with minimal or no training.

Standard development tools exist which aid in the development of graphical user interface in applications. Typically, a GUI development tool divides the application into screens called forms which represent major subdivisions of the user interface. Each form is composed of objects or controls with associated fields which allow data entry by the operator as well as data and instruction display by the program. There are many different types of controls available in the GUI development tool, including text boxes for alphanumeric data entry, check boxes for yes/no data entry, option buttons for choice selection, command buttons for running predefined event procedures, object frames for displaying graphical objects to the operator, and labels for displaying information such as operator instructions on the form. Each control type is defined by a particular subset of properties usually taken from a set of standard properties which are common to all control types. Property values determine the look and behavior of each control. For example, every control has a control name property, and a caption property. In addition, certain control types may have unique properties not used by other control types.

Application developers implement their programs by selecting controls from a menu of control systems and placing each control in the desired location on the form. The properties associated with the control type selected are then defined by the developer in order for the control to behave in the desired fashion. Each control type is implemented by a code module which defines the behavior for that control type. The behavior for the control can be adjusted by setting the values of the properties defined for that control type. For example, the behavior for a text box control type accepts data input into its associated field from the keyboard.

In many applications, the data to be entered in each control is stored on a pre-encoded medium such as a card, a parcel package, a product label, or a shelf tag. The data then can be retrieved by an input device such as a bar code reader. Further, data from other types of input devices such as microphones, digital cameras, pen input devices, and keyboards, among others, only needs to be captured and sent to its associated field in the form. Heretofore, when data from various input devices needed to be placed in a form, developers were required to develop custom routines and code on a case by case basis to link data generated by the input devices to the respective control types and data fields. This process is time consuming, tedious and costly.

BRIEF DESCRIPTION OF THE INVENTION

A method for responding to a data request by an application program in a computer system with a central processing unit and a transducer for providing data input to the system from a source having controllable operational features and parameters for adjusting characteristics of the data independently of the source and where the system's operating system manages data requests from the application program with one or more data entry fields and associated data entry criteria, by tagging the input data with an input source identification; packaging the data and the input source identification as a data module, the data module being associated with a predetermined data entry field in the application software; transferring the data module from the transducer to the application via the operating system; and associating the data module to one or more predetermined data entry fields of the application software based on the input source identification and the associated data entry criteria.

Implementations of the invention include the following. The invention automatically controls the input source by analyzing the data module and the data entry criteria and transfers the input data from the input source to the data entry field when the data entry criteria matches the input source identification. When the input source is a multimedia source such as a camera, possible control parameters include a brightness control parameter, a tint control parameter and a contrast control parameter.

In one aspect of the invention, the method provides data from one or more input sources through the operating system to the application software with one or more data fields by packaging data and an identification of the input source of the data as an entity, said entity being associated with a predetermined data entry field in the application software; sending the entity to the application software; and associating the entity to the predetermined data entry field based on said identification.

Implementations of the invention include the following. The identification information for each entity provides an indication of the source of input data, including a keyboard, a pen, a voice capture unit, a camera, an electromagnetic force interference detector, and a database server. The identification information for an entity includes indications of the conditions under which the data was input, such as the time, position, temperature, humidity, etc., and/or indications of the past history of data flow through the system.

Moreover, the packaging for an entity may be in the form of a data object with associated processing methods, and where a facility exists for concurrently managing a plurality of said data objects. The application software may also use a plurality of forms and wherein each form may consist of a plurality of form objects, and wherein said form objects collectively describe the data input requirements of said form. The form object may be represented by an input requestor and may possess a plurality of selection criteria, and wherein said selection criteria specify the conditions which must hold for a data object produced by an input source to satisfy the requirements of said form object. The selection criteria of a form object may be based on the content of the input data, the format of the input data and/or the identification information associated with the input data. Further, the processing or transfer details of a data object required to satisfy a form object may be accomplished transparently to the form object.

Further, the processing and transfer of a data object may involve operation sequencing, data translation, process synchronization, content filtering, or path routing. The processing and transfer of a data object may be accomplished by or in conjunction with an operating system, such as Windows CE or Java OS. The processing and transfer of data may be accomplished using a data exchange mechanism such as Dynamic Data Exchange (DDE), Component Object Model (COM), Object Linking and Embedding (OLE), Distributed Component Object Model (DCOM), or Common Object Broker Remote Access (COBRA). The association and integration of form objects with data objects may be accomplished using component object technology as Active-X controls or Java Beans. The form objects may be located within a plurality of forms, wherein said forms may exist within a plurality of applications, and wherein said applications may be executed on a plurality of computing systems, such as on a network.

Advantages of the invention are numerous. The invention provides a convenient environment, which handles in a seamless way data input from a wide variety of input sources.

Additionally, the invention allows multiple input sources to be used by one or more applications without regard to knowledge of the details of device control, operation sequencing, data translation, process synchronization, content filtering, or path routing.

Moreover, the invention allows a robust integration of data between application programs and the operating system. The user no longer needs to physically perform the data transfer function or to develop custom handler software for the data. Once specified in a form, data is dynamically placed into its destination field on the form. Moreover, the invention performs the data placement without requiring rigid rules and custom controls for each field.

Further, the invention provides well-defined methods for reading and/or accessing the data. By enforcing a separation of a particular interface from a particular implementation, the software creation, upgrade and maintenance process is simplified.

DETAILED DESCRIPTION OF A PREFERRED EMBODIMENT

Figure 1:
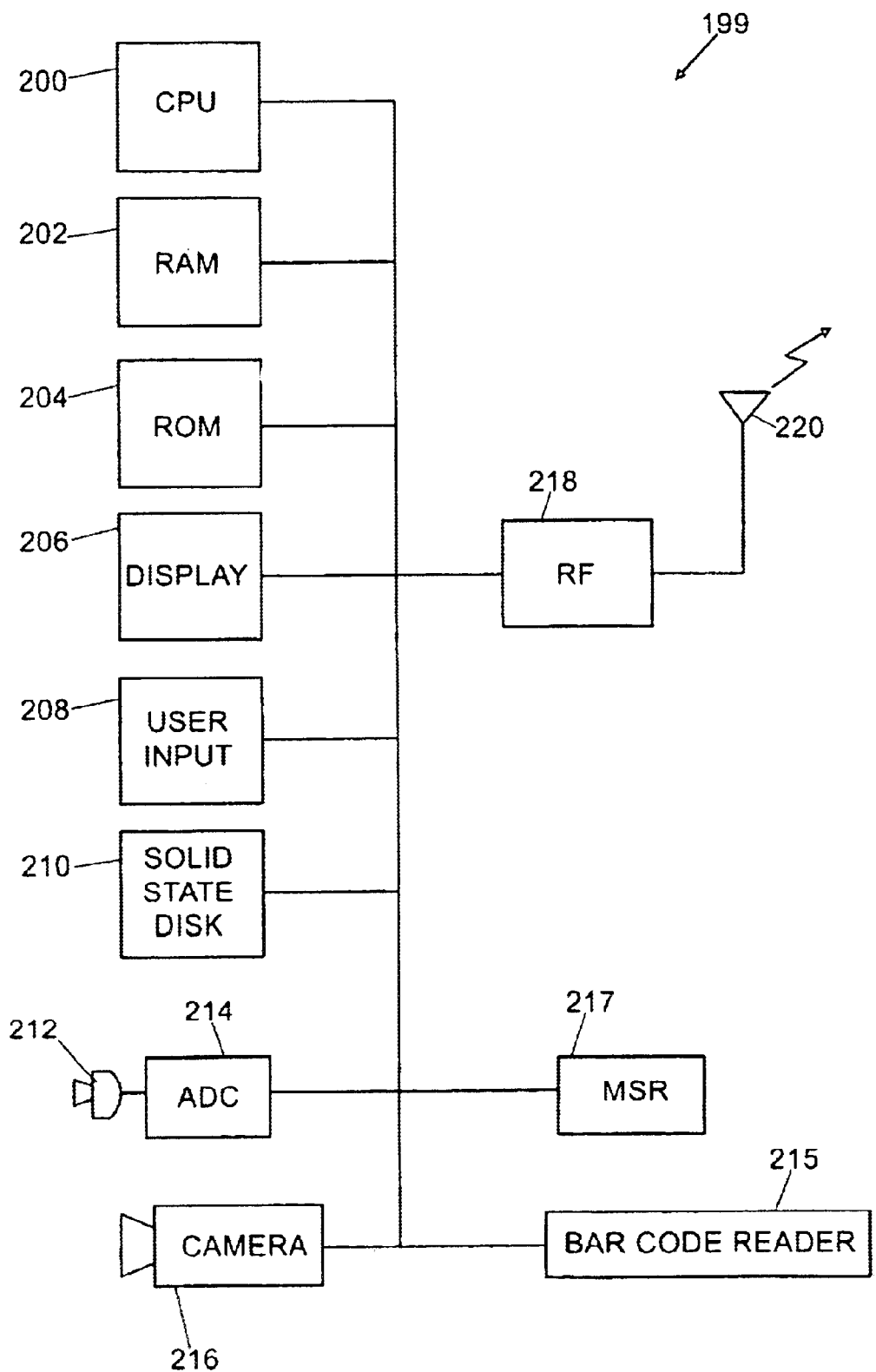
FIG. 1 illustrates an illustration of a computer system.

FIG. 1 shows a computer 199 which provides data to an application software from one or more input sources in accordance with the present invention. The computer 199 may be a laser-scanned, bar code symbol readers of the hand held, battery-operated type as disclosed in U.S. Pat. Nos. 4,387,297, 4,409,470 or 4,760,248, all assigned to Symbol Technologies, Inc., and hereby incorporated by reference. Additionally, the mobile nodes may be of the type disclosed in application Ser. No. 08/916,605 entitled "HAND-HELD OPTICAL READER TERMINAL WITH ERGONOMIC DESIGN", filed on Aug. 22, 1997, assigned to Symbol Technologies, Inc., and hereby incorporated by reference. Various other types of remote terminals or hand held computers may also be used. These remote terminals ordinarily would include data entry facilities such as a keyboard, as well as a display or a hard copy device for indicating information to a user. Although hand held, laser-scan type bar code readers are mentioned, the computer 199 may also include wand type or optical character recognition (OCR) type. Data from other types of input devices may be gathered by the computer 199, including temperature or pressure measuring devices, event counters, voice or sound activated devices, and intrusion detectors, among others.

In FIG. 1, the computer 199 has a central processing unit (CPU) 200 which is connected over a bus to various memory devices, including a random access memory (RAM) device 202 and a read-only memory (ROM) device 204. Additionally, the CPU 200 is connected to a display device 206. The display device 206 may suitably be a liquid crystal display (LCD) device, an array of light-emitting diodes (LEDs), or a hard copy device such as a printer. Moreover, the display device 206 may have a touch sensitive screen.

Additionally, one or more user input devices 208 such as a pen or stylus, a mouse and a keyboard may be connected to the CPU 200. Alternatively, an optional pop-up keyboard may be provided to appear on the touch-sensitive screen of the display 206. The pop-up keyboard provides a selection of soft keys on the screen which emulates a standard keyboard in order to allow keyed data entry without requiring an external keyboard. Using the pop-up keyboard, the user simply taps the desired soft key with the pen.

A solid state disk 210 may be connected to the CPU 200 for buffering voice input or video input, among others. The voice input may be captured by a microphone 212 whose output is digitized by an analog to digital converter (ADC) 214. The output of the ADC 214 is provided to the CPU 210 for processing. A camera 216 may also be provided to capture still images or video sequences and to provide the images to the CPU 200 for analysis as well as the solid state disk 210 for storage. The input source is controlled by analyzing the data module and the data entry criteria and transfers the input data from the input source to the data entry field when the data entry criteria matches the input source identification. When the input source is a multimedia source such as a camera, possible control parameters include a brightness control parameter, a tint control parameter and a contrast control parameter.

Further, to provide automatic data capture capability for various inventory and point-of-sale applications, among others, a bar code reader 215 and a magnetic stripe reader 217 are connected to the CPU 200. The bar code reader may be laser-based and may be of any type well known in the art which generates a visible beam and scans the beam across a bar code symbol with an oscillating mirror or similar device. Such a bar code reader may use a photodiode to detect the scanned beam which is reflected off the bar code and provides the detected signal for subsequent processing and decoding to generate data indicative of the target bar code. Alternatively, a charge coupled device (CCD) type scanner may be used. The CCD type scanner shines a sheet of light onto the target bar code and detects a reflected signal with a linear CCD array for capturing the bar code information.

The magnetic stripe reader 217 may read data from magnetically encoded cards in accordance with several standards. In one standard, an ANSI/ISO standard, 3 tracks are defined, each of which is used for different purposes. These tracks are defined only by their location on the magnetic stripe, since the magnetic stripe as a whole is magnetically homogeneous. Although the magnetic stripe reader 217 is a triple track device, it may also be single and dual track devices which allow reading a wide range of data, including ANSI/ISO format cards including credit/debit cards and driver licenses. Particularly, with the magnetic stripe reader 217, card data may be converted to keyboard scan codes or serial data stream for transmission to the CPU 200. Moreover, an auto detection capability is supported to allow a full keyboard to be emulated, thus avoiding the requirement that a keyboard be attached. Collectively, the user input device 208, the microphone 212, the camera 216, the bar code reader 215, and the MSR 217 may each be generically referred to as an input device for capturing a specific data type.

The CPU 200 may also be connected to an RF transceiver 218 for transmitting and receiving data using a wireless LAN. The RF transceiver 218 is connected to an antenna 220 for transmitting data to other computers. The wireless LANs use infrared (IR) or radio frequency (RF) transmissions instead of a physical connection. Infrared transceivers can use either a directed beam or a diffused infrared beam, while radio transceivers can use standard narrowband radio or one of two spread-spectrum schemes: Direct Sequence Spread Spectrum (DSSS), which spreads parts of a message across the available frequency range; or Frequency Hopping Spread Spectrum (FHSS), which transmits a short burst on one frequency, then hops to another frequency for the next burst.

The system of FIG. 1 includes an application program with a user interface, which is constructed at run time, and an interface control. The software further includes a data acquisition engine such as a bar code reader engine and/or MSR acquisition engine, a printing engine with a printer data interface, and a communications engine with a communications input/output interface. Typically, the user interface is a GUI interface, and the application program itself provides a form with fields therein for receiving information from a variety of input sources.

Figure 2:
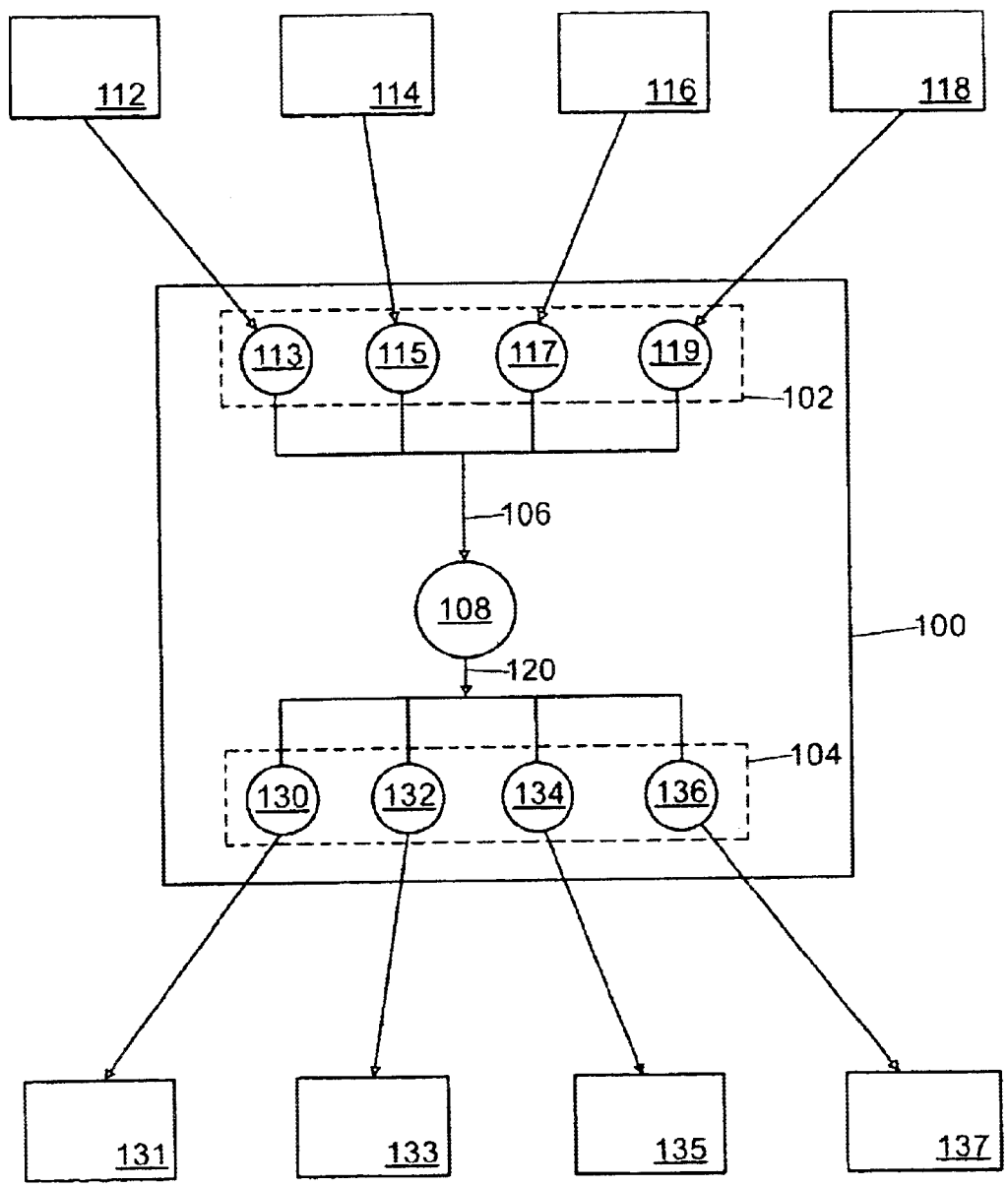
FIG. 2 illustrates software layers executing on the computer system of FIG. 1.

The application software used by the computer 199 is shown, highly schematically, in FIG. 2. The applications program itself 100, is typically constructed from an object-oriented programming language such as C++, Java, and the like. The programming language includes a class library 102 of data input objects and a corresponding class library 104 of data output objects. Each object within the data input class is designed to be associated with a particular type of input, and includes control rules to control the incoming data, transformation rules to transform the data into a defined output stream, and interaction rules defining its interaction with other objects. Each input object is arranged to supply its output in a common format, so that the outputs of several different input objects may be merged into a common output stream 106. Data within this common output stream is then supplied to the object or objects (generally indicated at 108) which make up the core of the applications program 100. In the example shown in FIG. 4, the input object class 102 includes four different objects 113, 115, 117, 119 which are each designed to receive input from a different input device. Each device produces input in its own particular format, the input then being received by the appropriate data input object and transformed into the common output stream 106, in which form it may be understood by the core object 108.

The data output objects within object class 104 operate in a similar manner. The core object 108 provides an output 120 in a defined format. Depending upon the output device which the program needs to use, or which is selected by the user, the program directs the output to an appropriate output object, which converts it into a format understood by the corresponding peripheral.

The data input and output objects are available to the applications programmer within the programming language. Within the program 100, therefore, there may be more than one instance of each data input or output object running at the same time.

Several separate applications programs, each running one or more instances of a particular input or output object, may run concurrently. Synchronization may be supplied using one or more synchronization objects.

Figure 3:
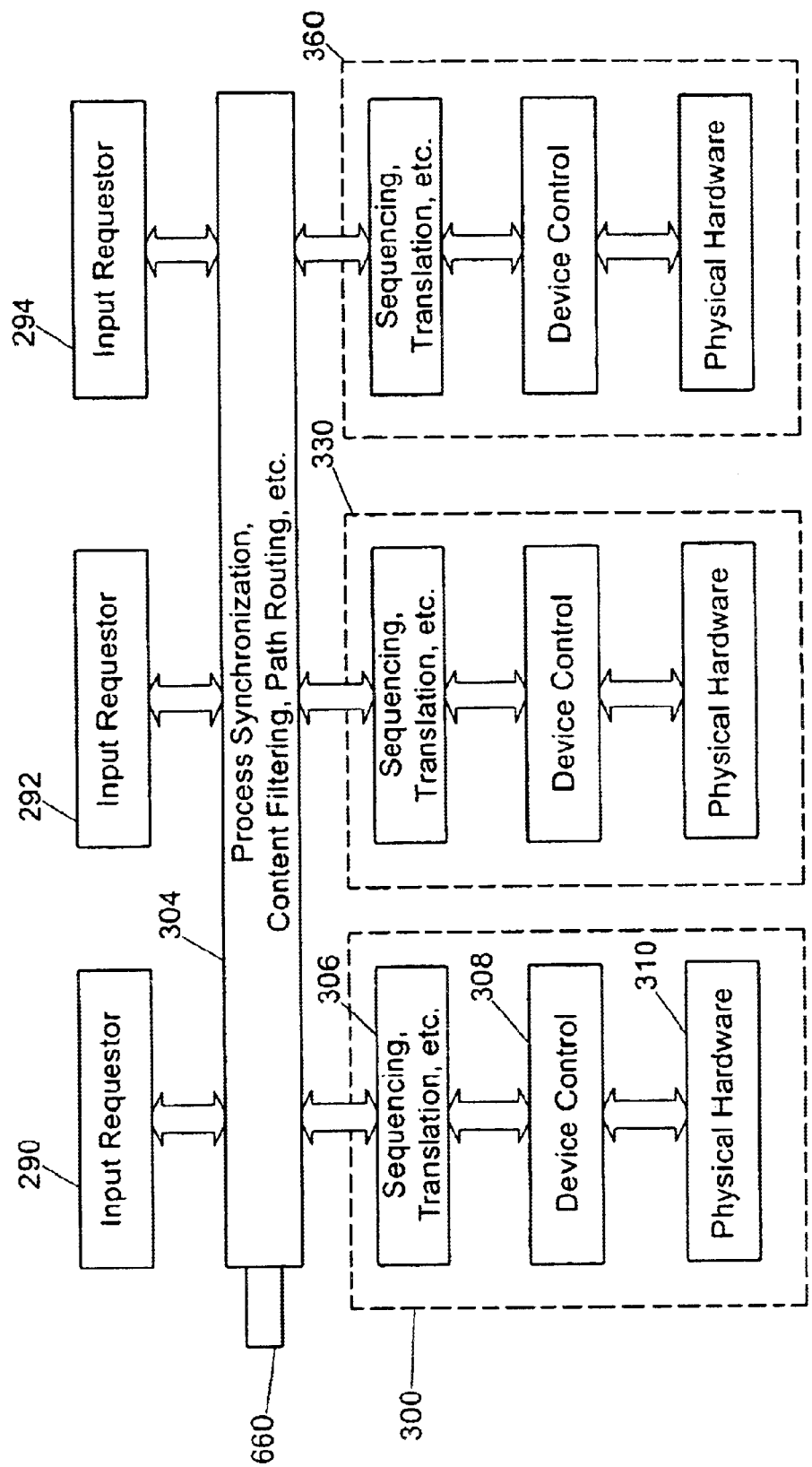
FIG. 3 illustrates a block diagram of a system to provide data from a plurality of sources to an application software.

The interface between the application program and the physical hardware generating data requested by the application program is shown in more detail in FIG. 3. As shown therein, a plurality of input requestors 290–294 reside at an application program level. The input requesters 290–294 may belong to different programs, or alternatively, may belong to the same application program. The input requestors 290–294 communicate with an intermediate data handling block 304.

Block 304 performs many tasks, including process synchronization, content filtering, and path routing functions. Process synchronization involves the order in which processes are run and the rules applied to a start, a stop or a run status for each process. For example, if input data is coming from a scanner and input data is also coming from a keyboard, the application may wish to start and stop a scanning process based on whether any data has been keyed in yet since once the user has started keying in data, that data should not be mixed with scanned data in satisfying the same input request. Thus, multiple processes may be executing simultaneously, each of which attempts to acquire input on behalf of an input requestor and independent processes dealing with multiple data sources have to synchronize using a predetermined criteria based on the needs of the input requestor.

Block 304 also may perform content filtering. Content filtering relates to limitations on the type of data the requester receives. The process acts as a gatekeeper of data by limiting its acceptance to the types of data that might be suitable by eliminating data whose content is unsuitable to the requestor's requirements.

Block 304 also may performs path routing. Path routing relates to a correct placement of data to an appropriate requestor. In some cases, this could be based on content filtering as well. For example, if one requestor asks for data before another requestor, data with an earlier timestamp may be routed to the first requestor absent any other directives or criterion.

Data blending and stratification also occur in the data block 304. Multiple input sources may be combined into a data pipeline where agents on behalf of each of the input requestors direct individual items of data out of the pipeline to the individual input requestors once all the criteria have been met.

The data block 304 in turn communicates with a plurality of data generators 300, 330 and 360. Since the data generators 330 and 360 are identical to the data generator 300, only details of the data generator 300 are discussed next.

The data generator 300 has a sequencing and translation block 306. Sequencing relates to the order of precedence of data from different sources and may involve giving precedence based on source of data, type of data, or source of the request for data. For example, the computer system may have several processes which request scanned data from the same source and it may be necessary to send the requests for that scanned data in a particular order. Hence, if two requests are presented, the sequencing operation determines whether the requests have to be ordered in some fashion or whether they can be served simultaneously, based on certain criteria only known once a particular hardware device has been selected.

Additionally, block 306 performs data format translation. The translation process ensures consistency in the data format coming from the device and a common data format that the system at higher layers expects. For example, bar code symbol data may be acquired in a Unicode format, while the system may be working in an English character set and therefore would require a translation.

Block 306 communicates with a device control block 308, which is responsible for managing the behavior of the physical hardware. Block 308 performs one operation on its associated device at a time, and the order of performing its operation is determined by block 306. Block 308 in turn communicates with a physical device or hardware 310. The device 310 may be a scanner, a keyboard, a digitizer tablet, a flatbed scanner, a digital camera, or a microphone, among others.

Figure 4:
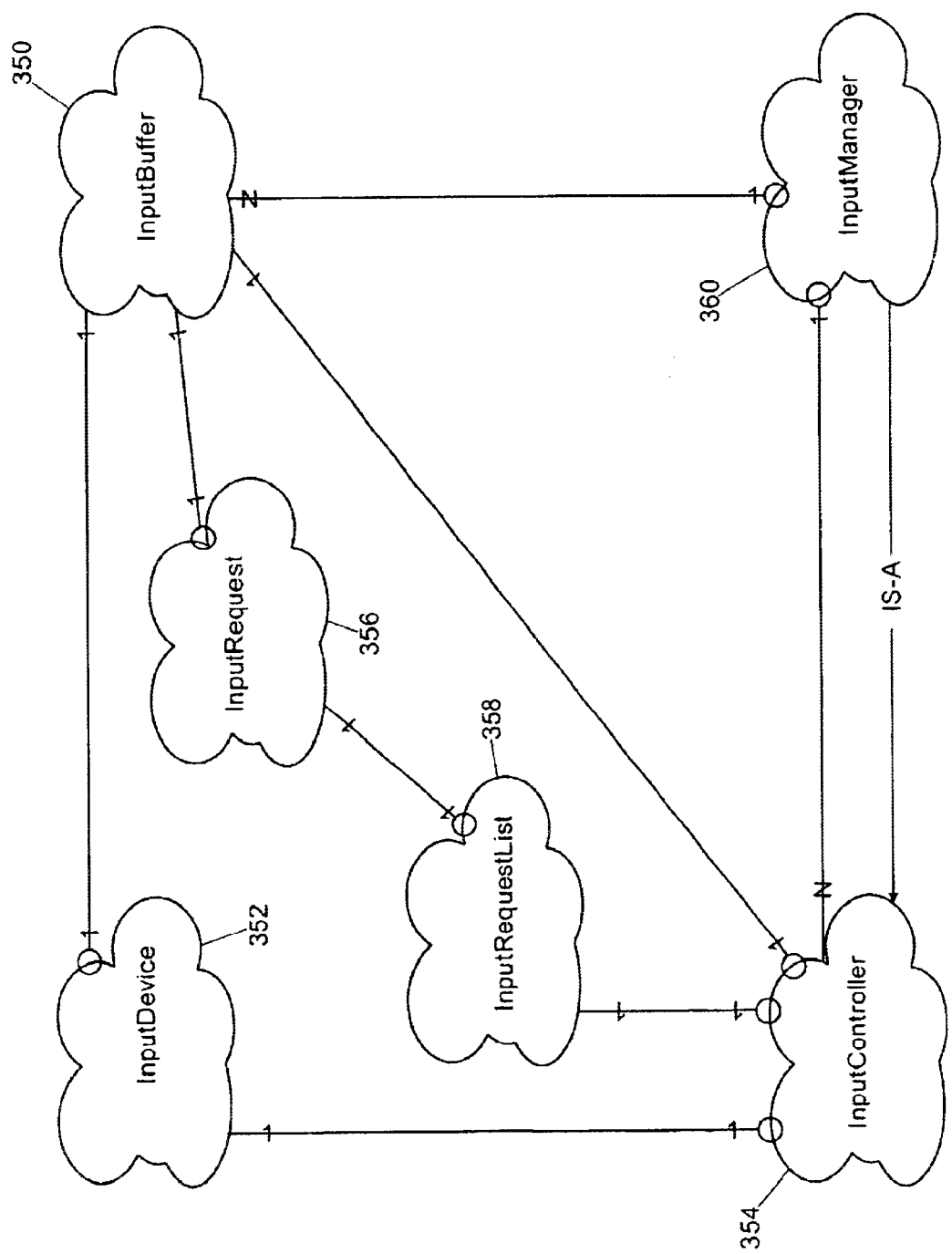
FIG. 4 illustrates a diagram illustrating class relationships amongst a plurality input objects.

FIG. 4 shows classes of objects and abstract class relationships among these objects. Typically, each instance of an object is an individual, separate memory set aside for the storage of its data members. The object-oriented program is a data-oriented approach to software design and development, where the data is encapsulated in objects and messages are used to manipulate the data. An object is encapsulated data that can be accessed or manipulated by means of a set of interface functions or handles. A message is the mechanism by which a particular operation is performed on data encapsulated within an object. Thus, an object is defined in terms of the data it encapsulates and the operations of the data that are allowed by the set of interface functions. Encapsulation of data enables information hiding. Encapsulation helps enforce a scheme where data access and data manipulation are uniform for all objects of the same class. By providing interface functions such as member functions or methods, access to the encapsulated data is restricted and illegal access is prohibited. The set of operations defined on the encapsulated data is implemented in the code of the member functions. The only operations permitted on the encapsulated data are those defined in the interface functions.

The concept of class is an extension of the notion of user-defined types. The concept of class helps implement information hiding. A programmer using a class does not have to know about the internals of a class. As a result of information hiding, the code in which the class is used does not depend on implementation details of the class. Abstract classes are classes defined solely for the purpose of deriving other classes or subclasses. An abstract class is usually created to serve as a route of a class hierarchy.

In FIG. 4, an object-oriented design approach is used to encapsulate various details behind standardized interfaces. Layers communicate only via interfaces. Further, an input system is constructed from a set of various objects which are configured independently of the data requestor. In FIG. 4, an InputBuffer class 350 is used by an InputDevice class 352. Similarly, the InputBuffer class 350 is also used by an InputRequest class 356, an InputController class 354, and an InputManager class 360. The InputManager class 360 is a subclass of the InputController class 354. The InputRequest class 356 in turn is used by an InputRequestList class 358. The InputController class 354 uses both the InputDevice class 352 and the InputRequestList class 358.

As a group, objects associated with the InputBuffer, InputRequest and InputRequestList classes are data objects, while objects associated with the InputDevice, InputController and InputManager classes are processing objects. The InputBuffer class 350 encapsulates information about data to be received by a generic input device and the readiness of that data. It is also used to provide a standard way of passing data between the various layers and interfaces in the system and has standardized interfaces to allow others to access the data. The InputDevice class 352 provides control for managing a device and obtaining input from the device. It handles one input request at a time and does not handle or queue up multiple input requests. The class 352 stores data into and signals completion via a supplied object of the class InputBuffer 350. The InputRequest class 356 keeps track of information about a pending input request. It allows multiple input requests to be tracked and further allows tracking-specific information to be associated with the InputBuffer class 350 for a pending request. The InputRequestList class 358 manages an ordered list of InputRequest objects and supports insertion, deletion, and searching operation, among others. This class is used by an InputController to keep track of multiple pending input requests. The InputController class 354 represents the primary input interface and typically controls a single InputDevice. The InputController class 354 maintains an InputRequestList which contains an InputRequest for each pending request. It also schedules an InputDevice to service pending requests in order. The InputManager class 360 implements the same interface as InputController class 354 and manages multiple InputController objects and handles the sequencing and coordination between them. The class 360 can implement rules for filtering, coexistence, or precedence.

Figure 5:
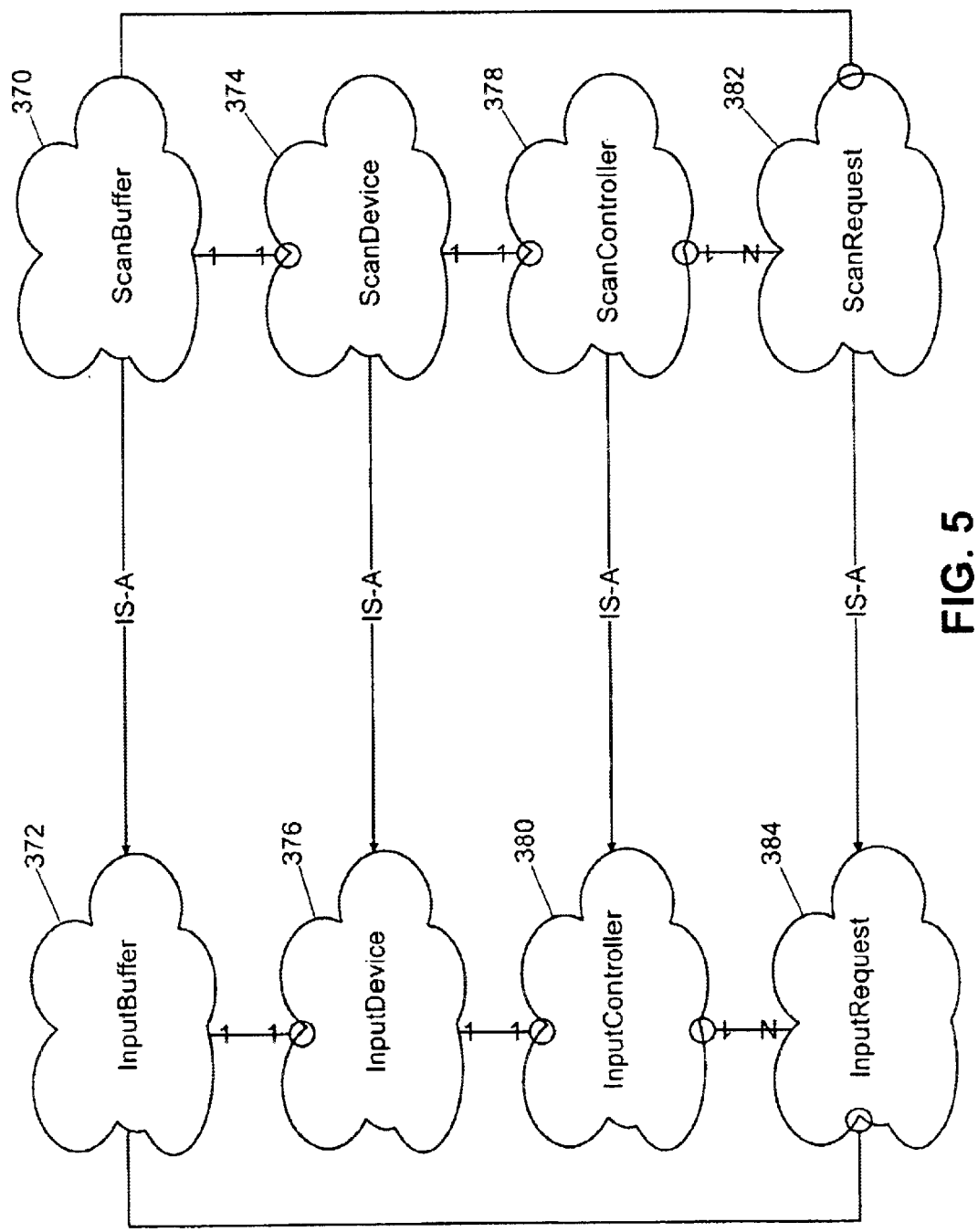
FIG. 5 illustrates a diagram illustrating an abstract class relationship for scanning related devices.

FIG. 5 shows a diagram of an abstract class relationship for scanning-related objects. In FIG. 5, a ScanBuffer class 370 is a subclass of an InputBuffer class 372. Similarly, a ScanDevice class 374 is a subclass of an InputDevice class 376, a ScanController class 378 is a subclass of an InputController class 380, and a ScanRequest class 382 is a subclass of an InputRequest class 384. Moreover, the ScanBuffer class 370 is used by the ScanDevice class 374, which in turn is used by the ScanController class 378, and which is used by the ScanRequest class 382. The relationships among the InputBuffer class 372, the InputDevice class 376, the InputController class 380 and the InputRequest class 384, are identical to that described in FIG. 4.

Generally, the ScanBuffer class 370 holds additional information captured by scanner devices. The additional information is not necessarily applicable to data that comes from other sources. This information includes the type of bar code symbols that were scanned, the direction of scanning, the check digits, among others. Similarly, the ScanDevice class 374 is a member of the InputDevice class 376, which means it has all the characteristics of the InputDevice class 376, plus additional characteristics related to scanning operations. The ScanController class 378 is a member of the InputController class 380 and may have additional characteristics relating to the sequencing or translating scanned information. The ScanRequest class 382 is a member of the InputRequest class 384. It also contains additional information about a scanning request such as which bar code symbol types to scan, among others.

Figure 6:
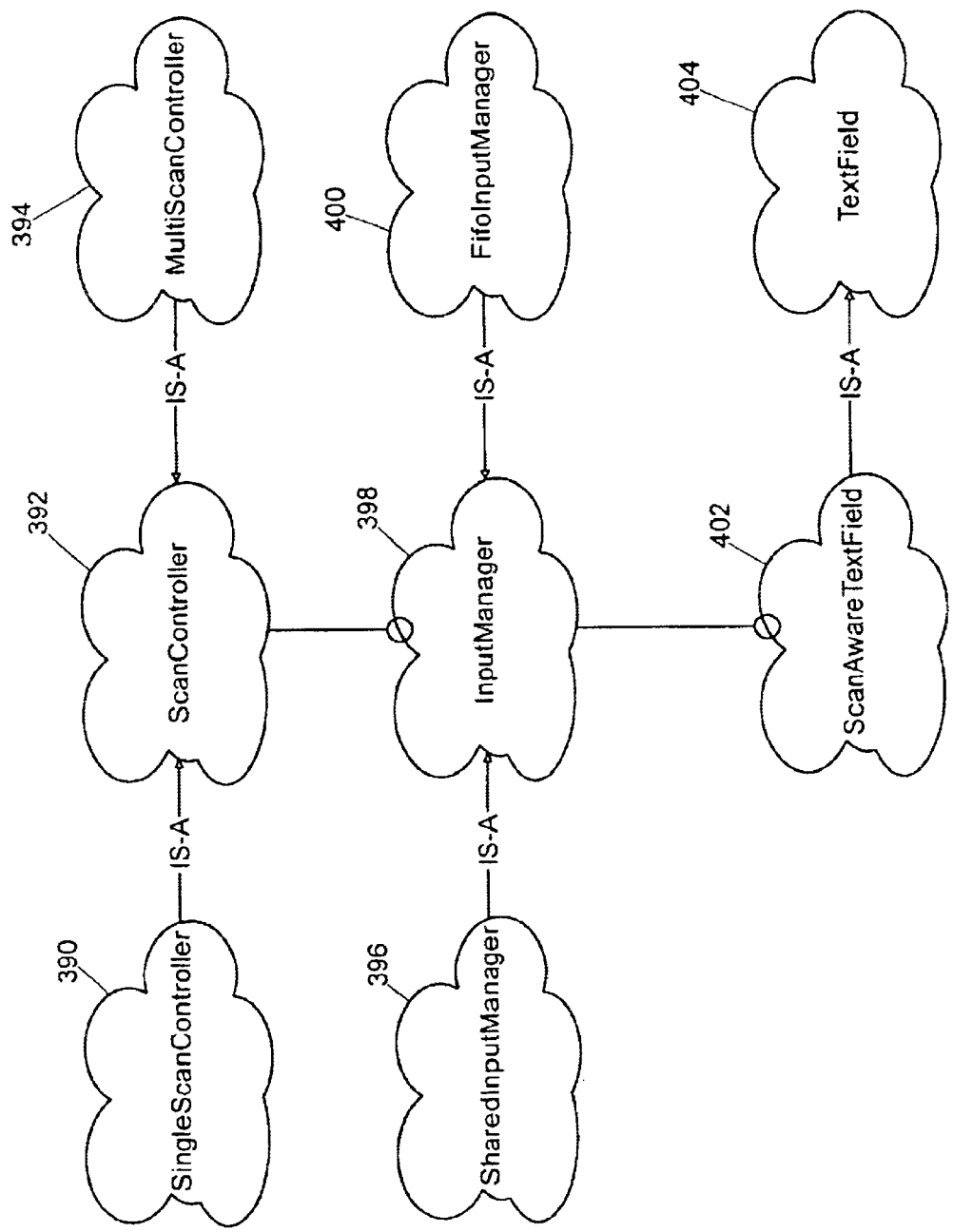
FIG. 6 illustrates a diagram illustrating class relationships amongst input objects to a text field object.

FIG. 6 is an example showing one interaction among various objects in performing a scan operation and in providing scan data to a requestor. In FIG. 6, a ScanController object 392 with objects 390 and 394 in subclasses SingleScanController and MultiScanController, respectively. The difference between the objects 390 and 394 is that a SingleScanController always treats incoming scan requests as sequential in nature and guarantees that the first request to come in receives the first bar code symbol that is scanned and suspends the processing of the next request until the prior request has received a scan. The MultiScan Controller object 394 belongs to the ScanController class, so it has identical characteristics, but it reviews requests at the front of the list to see if they are compatible or unambiguous and process the requests in parallel. Hence, input requests may be satisfied out-of-order since the user can click on any one of the input fields and start entering data. Here, an application may use the SingleScanController or the MultiScanController objects 390 or 394. It will get different behavior, but it interfaces them the same way.

Next, the application may use a SharedInputManager object 396 or a FifoInputManager object 400, both being subclasses of the InputManager object 398. Objects 396 and 400 address the level of process synchronization as opposed to sequencing. The SharedInputManager object 396 manages a plurality of input devices on behalf of one input request. In object 396, the first input device that finishes locks out all the rest. Moreover, since all input devices are working on the same request, they can cooperate on satisfying that one request or they can compete for fulfilling that one request. Thus, if a keyboard device is trying to satisfy the same request that a scan device is trying to satisfy, once the keyboard device has placed some data into the input buffer, the scanner device is prevented from placing data into the same field. However, if the user backspaces and clears out that field, then the scanner as well as the keyboard is enabled, thus "cooperating" on that request.

The FIFOInputManager object 400 takes a different model. In the FIFOInputManager 400, all controllers are active and produce input which satisfies requests on a first-come-first-served basis. Thus, data requests are satisfied in a serial or sequential basis. In the SharedInputManager 396, one input request at a time is sent to all input controllers, the first to finish locks out all others until the next request is ready to start.

Moreover, a TextField object 404 provides a data entry field in which a user can type text. A ScanAwareTextField object 402 in turn is a subclass of a TextField object 404. The ScanAwareTextField object 402 uses the InputManager object 398 and is a subclass of the TextField object 404. The ScanAwareTextField object 402 thus combines GUI text control functionality with the InputManager functionality and allows any input from the pipeline to be fed into a standard text control. Further, the configuration of the InputManager object 398 is independent of the text control.

Figure 7:
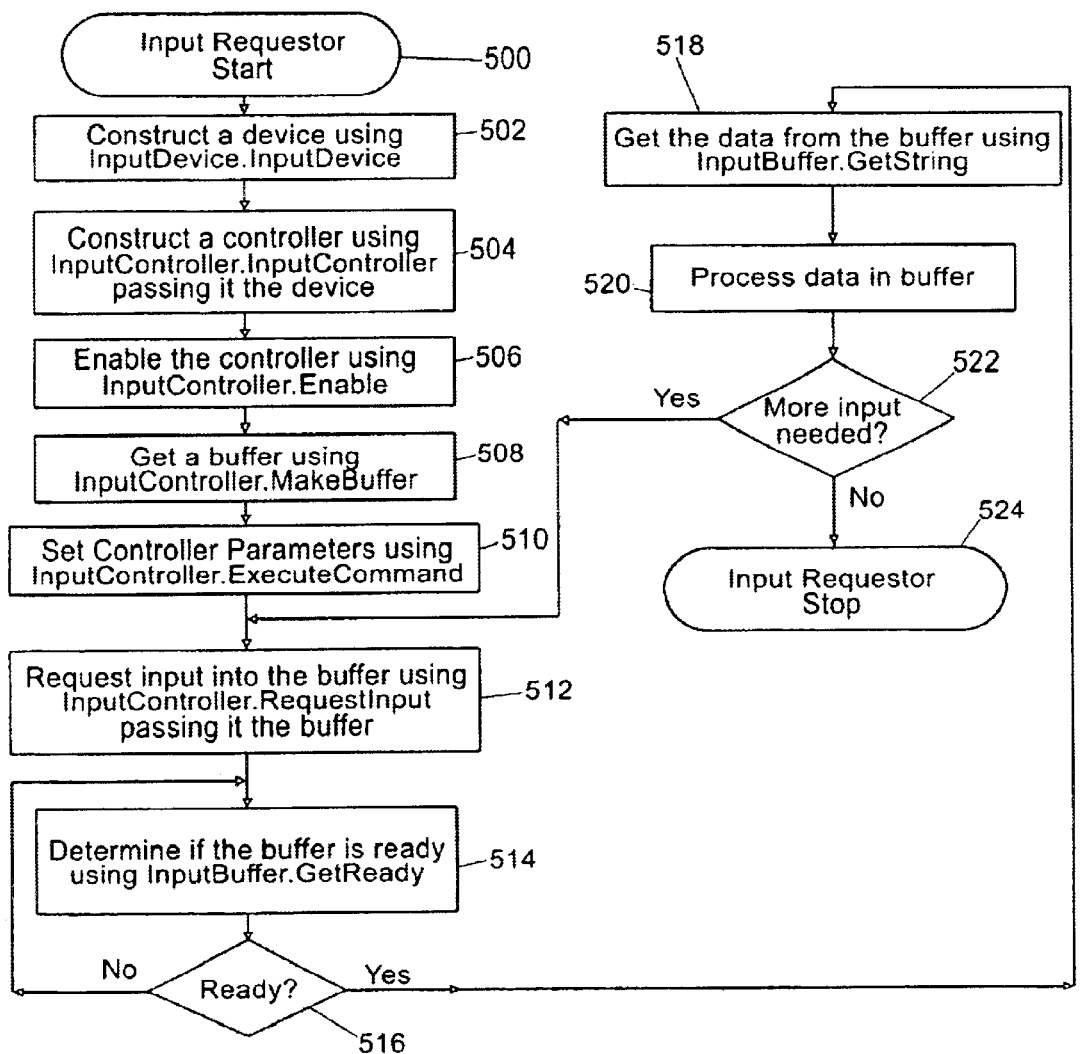
FIG. 7 illustrates a process for handling an input requestor.

Referring now to FIG. 7, one implementation of an Input Requestor process 500 is illustrated. First the process 500 constructs the device using InputDevice.InputDevice (step 502). Next, the process 500 constructs a controller using an InputController.InputController function and passing it the device information (step 504). The process 500 then enables the controller using an InputController.Enable function step (506) and obtains a buffer using an InputController.MakeBuffer function (step 508).

Next, the process 500 sets various controller parameters using InputController.ExecuteCommand function (step 510). The process 500 then requests inputs into the buffer using InputController.RequestInput and passing it the buffer pointer (step 512).

Next, the process 500 determines whether the buffer is ready using an InputBuffer.GetReady function (step 514). From step 514, the process 500 determines whether the buffer is ready in step 516. If not, the process loops back to step 514 until the buffer is ready. From step 516, when a buffer becomes available, the process of FIG. 5 proceeds to step 518 where it obtains data from the buffer using an InputBuffer.GetString function. Further, the data is processed in the buffer (step 520). The process of FIG. 5 then checks whether additional input is needed (step 522). If so, the process loops back to step 512 to continue requesting input into the buffer. Alternately, the process of FIG. 5 exits (step 524).

Figure 8:
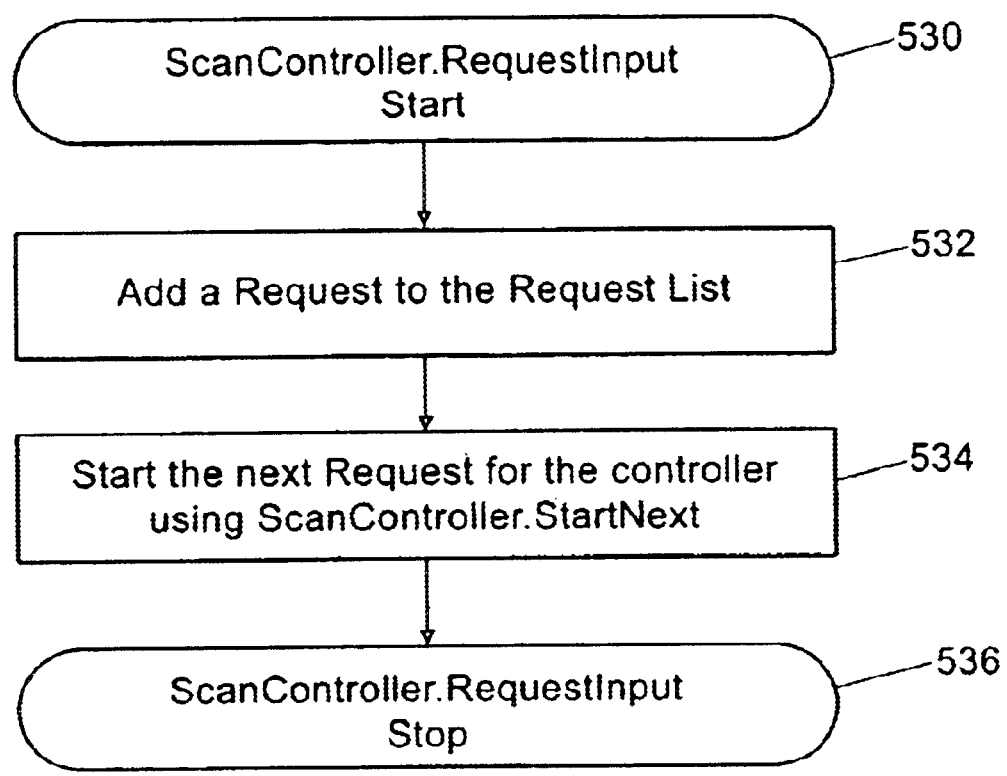
FIG. 8 illustrates a process for handling request inputs from a scan controller.

Turning now to FIG. 8, one implementation of a ScanController.RequestInput process 530 is shown. Upon entry to the routine, the process of FIG. 8 adds a request to the request list (step 532). Next, it starts the next request for the controller using a ScanController.StartNext function (step 534) before exiting (step 536).

Figure 9:
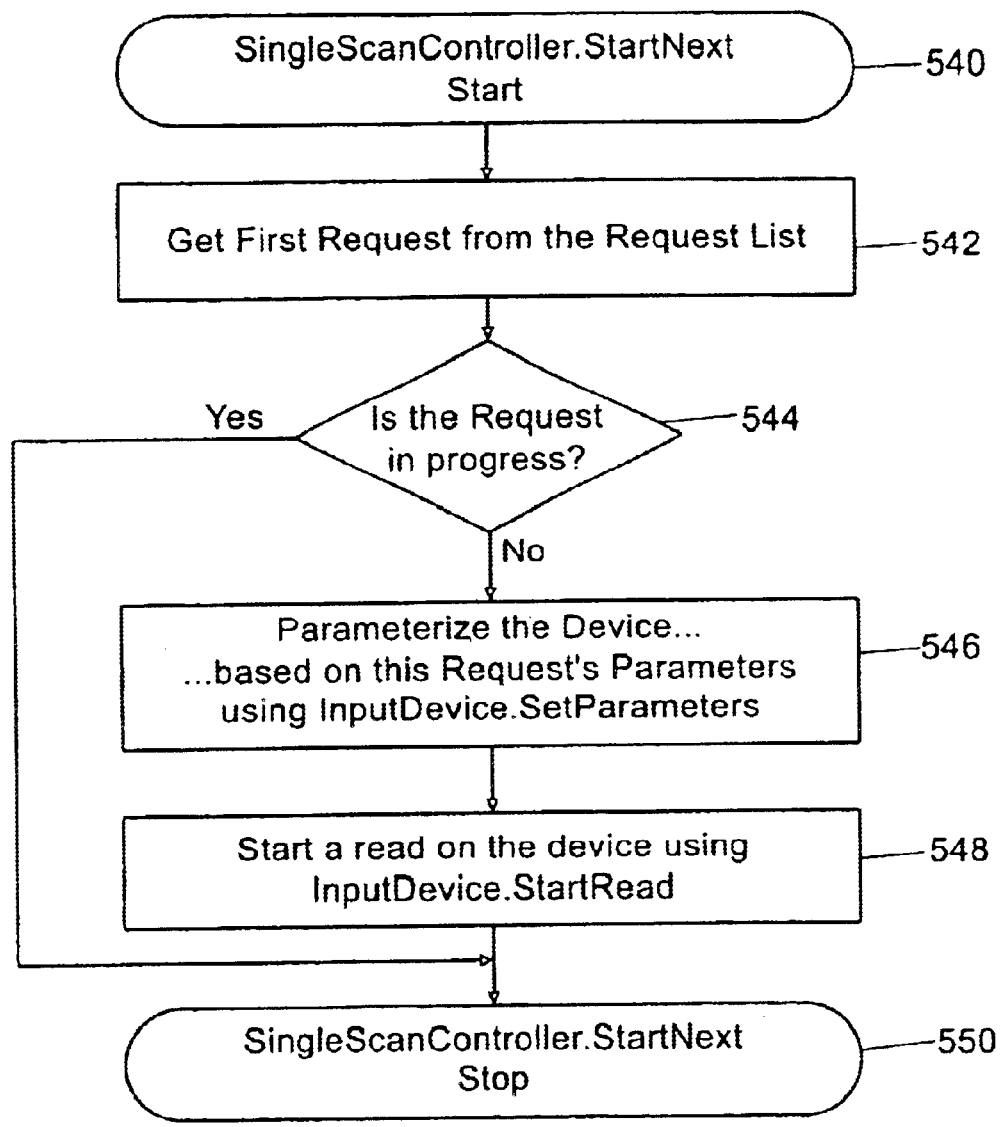
FIG. 9 illustrates a process for handling a single scan controller.

Turning now to FIG. 9, one implementation of a SingleScanController.StartNext process 540 is shown in detail. First, the process of FIG. 9 obtains a first request from the request list (step 542). It then checks whether the request is in progress (step 544). If not, the process of FIG. 9 parametizes the device based on the request's parameters and also based on an InputDevice.SetParameter function (step 546). Additionally, the process of FIG. 9 starts a read operation on a device using InputDevice.StartRead function (step 548) before exiting (step 550). From step 544, in the event that the request is in progress, the process of FIG. 9 proceeds to step 550 to exit.

Figure 10:
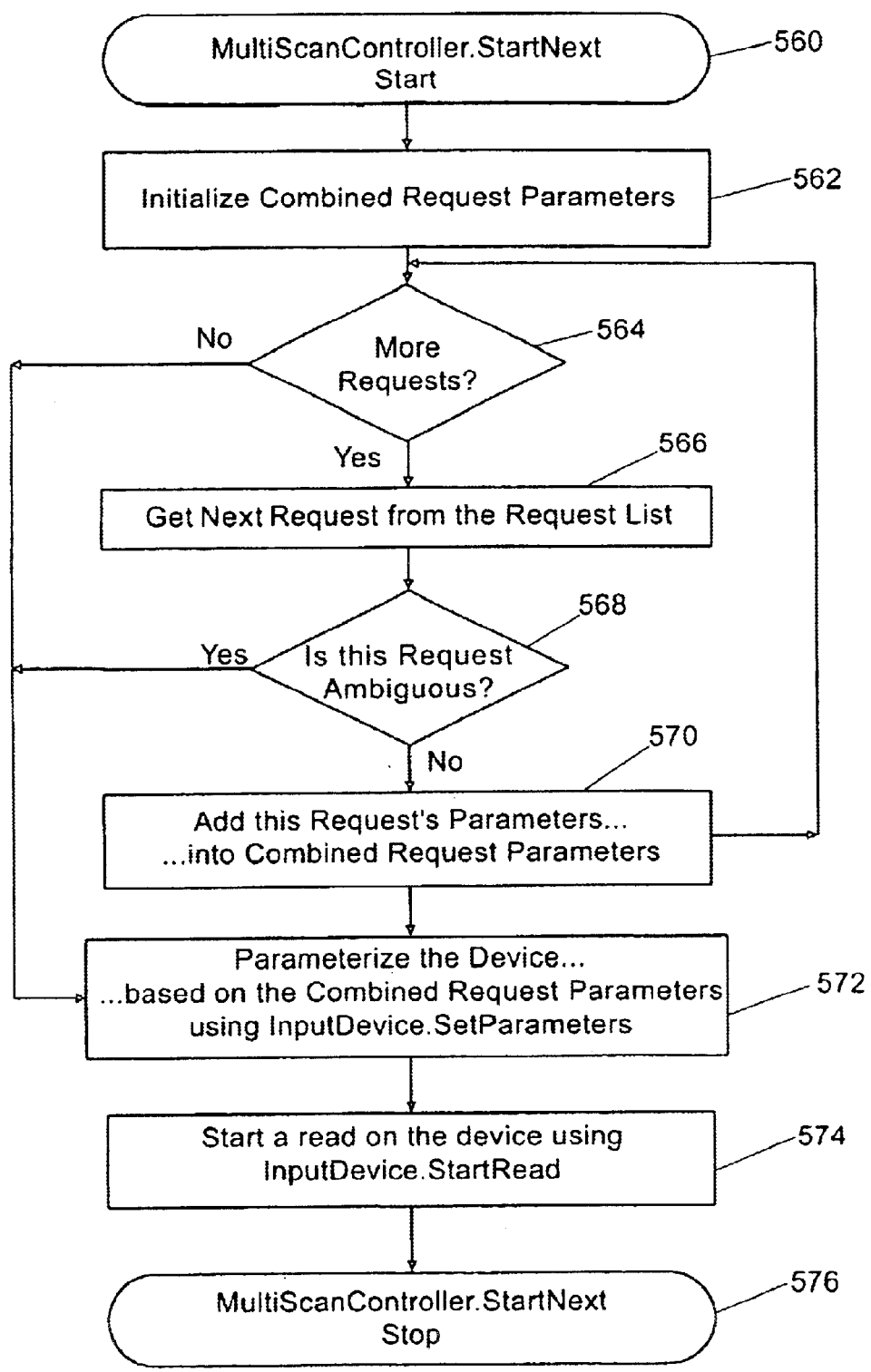
FIG. 10 illustrates a process for handling a multiscan controller.

Turning now to FIG. 10, one implementation of a MultiScanController.StartNext function 560 is shown. First, the process of FIG. 10 initializes a combined request parameter list (step 562). Next, the process of FIG. 10 checks whether additional requests are pending (step 564). If so, the next request is retrieved from the request list (step 455). The process then checks whether the request is ambiguous (step 568). If not, the request parameters are added into a combined request parameters list (step 570) and the process loops backs to step 564 to continue handling requests.

In step 564, in the event that all requests have been handled, the process of FIG. 10 proceeds to step 572 where it parametizes device information based on the combined request parameters using an InputDevice.SetParameters function (step 572). Next, the process of FIG. 10 starts a read on a device using the InputDevice.StartRead function (step 574) before exiting in step 576.

Figure 11:
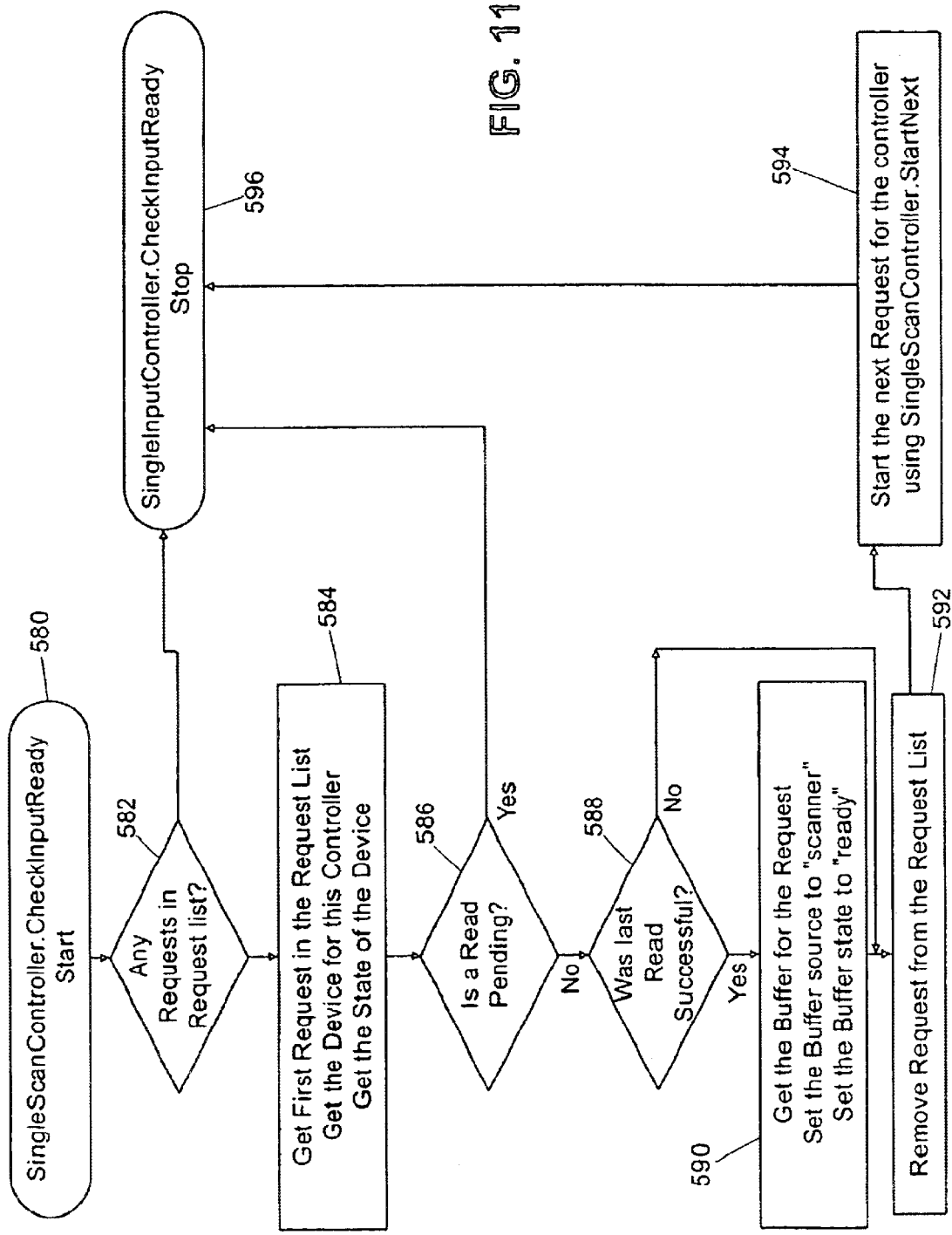
FIG. 11 illustrates a process for handling check inputs of a single scan controller.

Referring now to FIG. 11, one implementation of a SingleScanController.CheckInputReady process 580 is illustrated. First, the process of FIG. 11 checks whether one request is present in the request list (step 582). If so, the process obtains the first request in the request list, the device for the controller, and the state of the device (step 584). The process of FIG. 13 then checks whether a read is pending (step 586). From step 586, the process of FIG. 13 then checks whether the last read was successful (step 588). If so, the process obtains a buffer for the request, sets a buffer source tag to "scanner" and sets a buffer state to "ready" (step 590). From step 590 or step 588, the process then proceeds to step 592 where it removes the request from the request list. Subsequently, the process of FIG. 11 starts the next request for the controller using a SingleScanController.StartNext function (step 594) before exiting (step 596). Step 596 is also reached from step 582 in the event there are no requests in the request list, or from step 586, in the event a read operation is pending.

Figure 12:
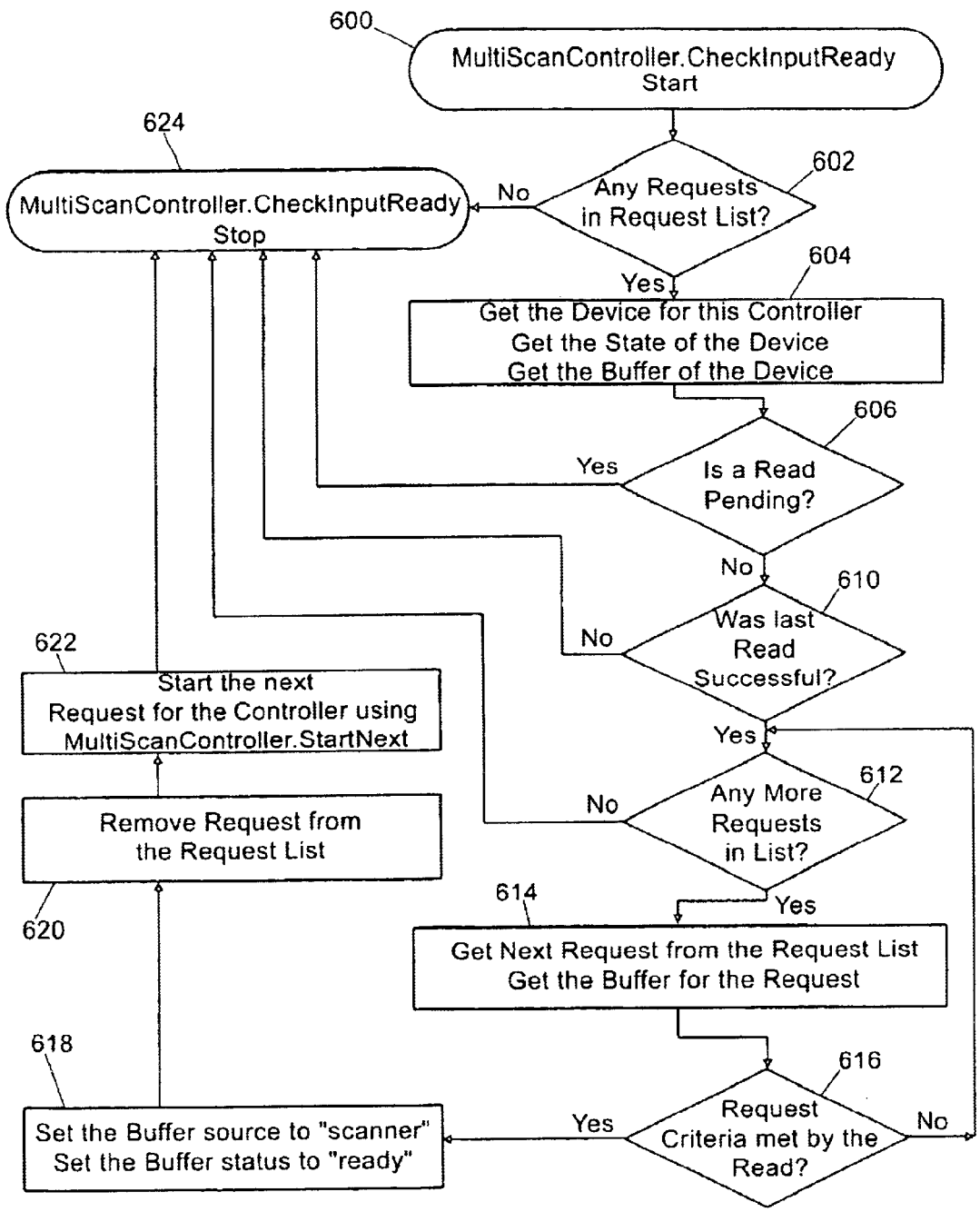
FIG. 12 illustrates a process for performing check input for a multiscan controller.

Referring now to FIG. 12, one implementation of a MultiScanController.CheckInputReady function 600 is shown. First, the process of FIG. 12 checks whether any requests are present in the request list (step 602). If so, the process of FIG. 14 obtains the device for the controller, a state of the device, and a buffer for the device (step 604). Next, the process checks whether a read is pending (step 606). If not, the process also checks whether the last read was successful (step 610). If so, the process determines whether additional requests are present in a list (step 612). If so, the process of FIG. 12 obtains the next request from the request list and obtains a buffer for the request (step 614). It then checks whether the request criteria has been met by the read operation (step 616). If not, the process loops back to step 612 to process the next request from the request list. Alternatively, in the event of the request criteria is satisfied in step 616, the process of FIG. 12 proceeds to step 618 where it sends the buffer source to "scanner" and buffer status to "ready." It then removes the request from the request list (step 620) and starts the next request for the controller (step 622) before exiting (step 624).

Figure 13:
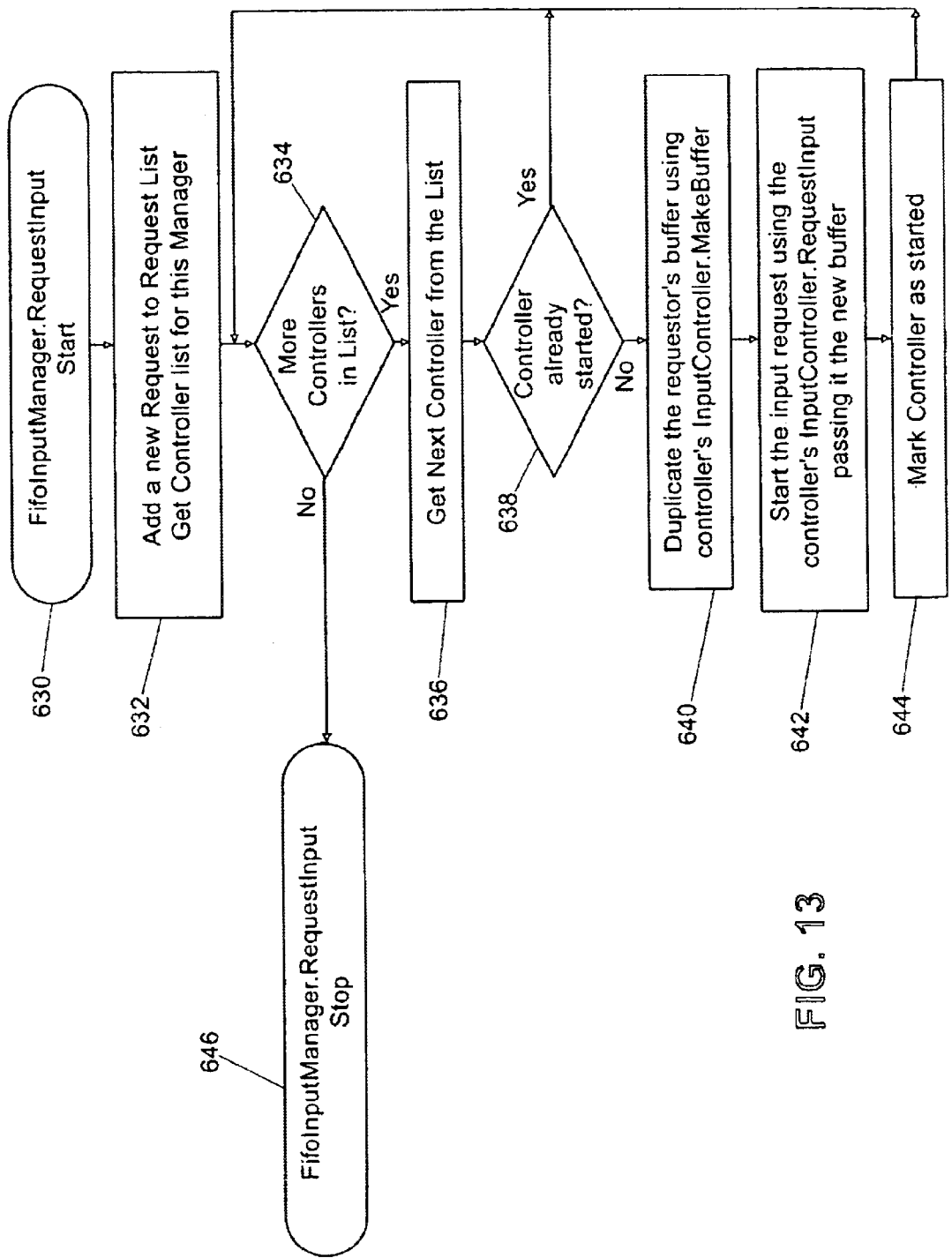
FIG. 13 illustrates a process for handling input requests for a first-in-first-out (Fifo) input manager.

Turning now to FIG. 13, one implementation of a FifoInputManager.RequestInput function 630 is shown. First, the process adds a new request to the request list and obtains a controller list for the manager (step 632). The process then checks whether additional controllers remain on the list (step 634). If so, it obtains the next controller from the list (step 636). The process also checks whether the controller has already been started (step 638). If so, the process loops back to step 634 to handle the next controller in the list. Alternatively, if the controller has not been started in step 638, the process of FIG. 13 duplicates the requestor's buffer using an InputController.MakeBuffer function (step 640).

Further, the process starts the input request using the controller's InputController.RequestInput function and passing it the new buffer (step 642). The process then marks a controller as having been started (step 644). From step 644, the process loops back to step 634 to process the remaining controllers on the list. Finally, in the event that all controllers have been processed in step 634, the process of FIG. 5 exits (step 646).

Figure 14:
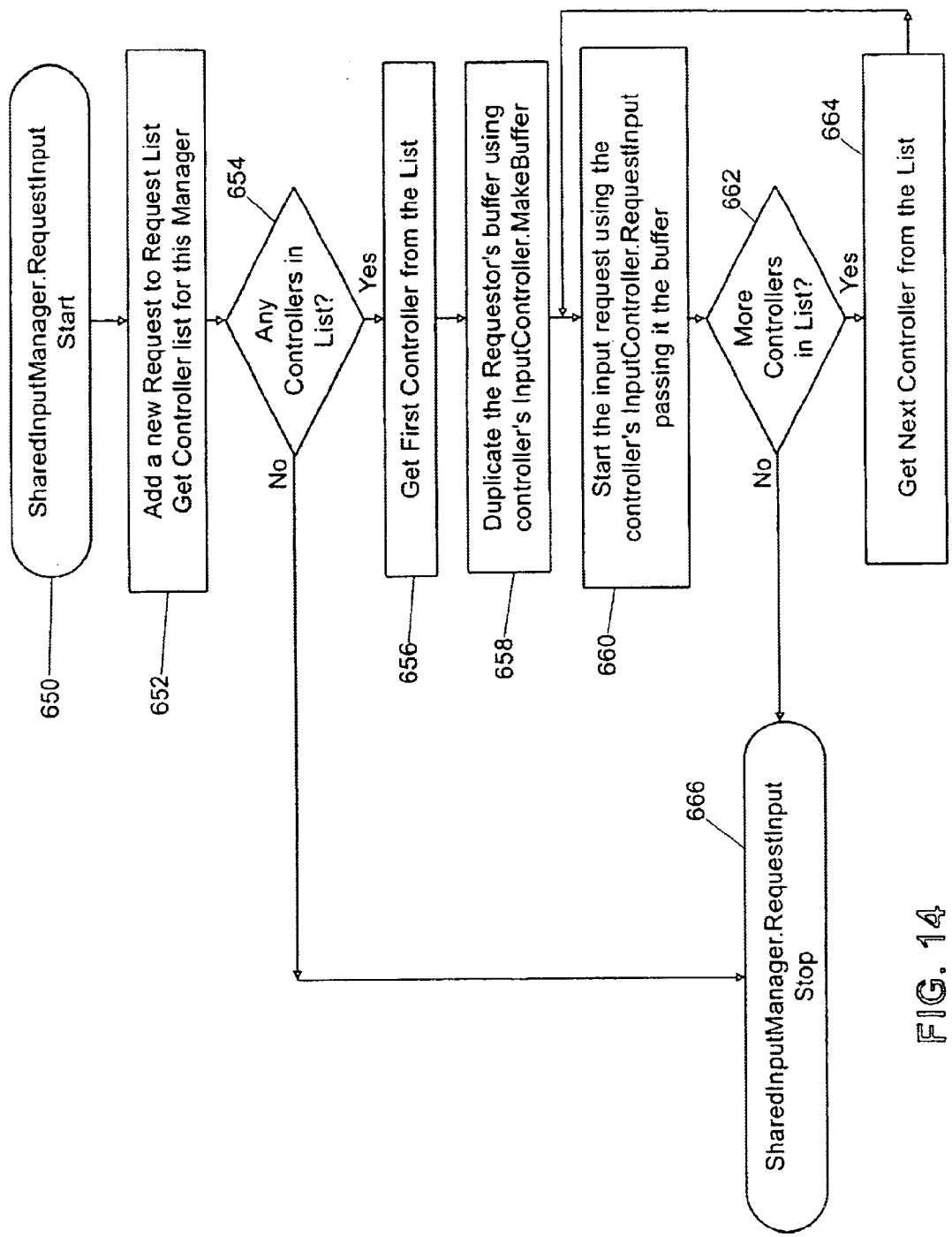
FIG. 14 illustrates a process for handling input requests for a shared input manager.

FIG. 14 shows one implementation of a SharedInputManager.RequestInput function 650. The process of FIG. 14 adds a new request to the request list and obtains a controller list for the manager (step 652). It then checks whether additional controllers remain in list (step 654). If so, the process obtains the next controller from the list (step 656) and duplicates the requestor's buffer using the controller's InputController.MakeBuffer function (step 658). The process also starts the input request using the Controller's InputController.RequestInput function and passes it the buffer (step 660). The process of FIG. 14 checks whether additional controllers need to be handled (step 662). If so, the next controller is obtained from the list (step 664) before looping back to step 654. Alternatively, in the event that all controllers have been handled, the process exits (step 666).

Figure 15:
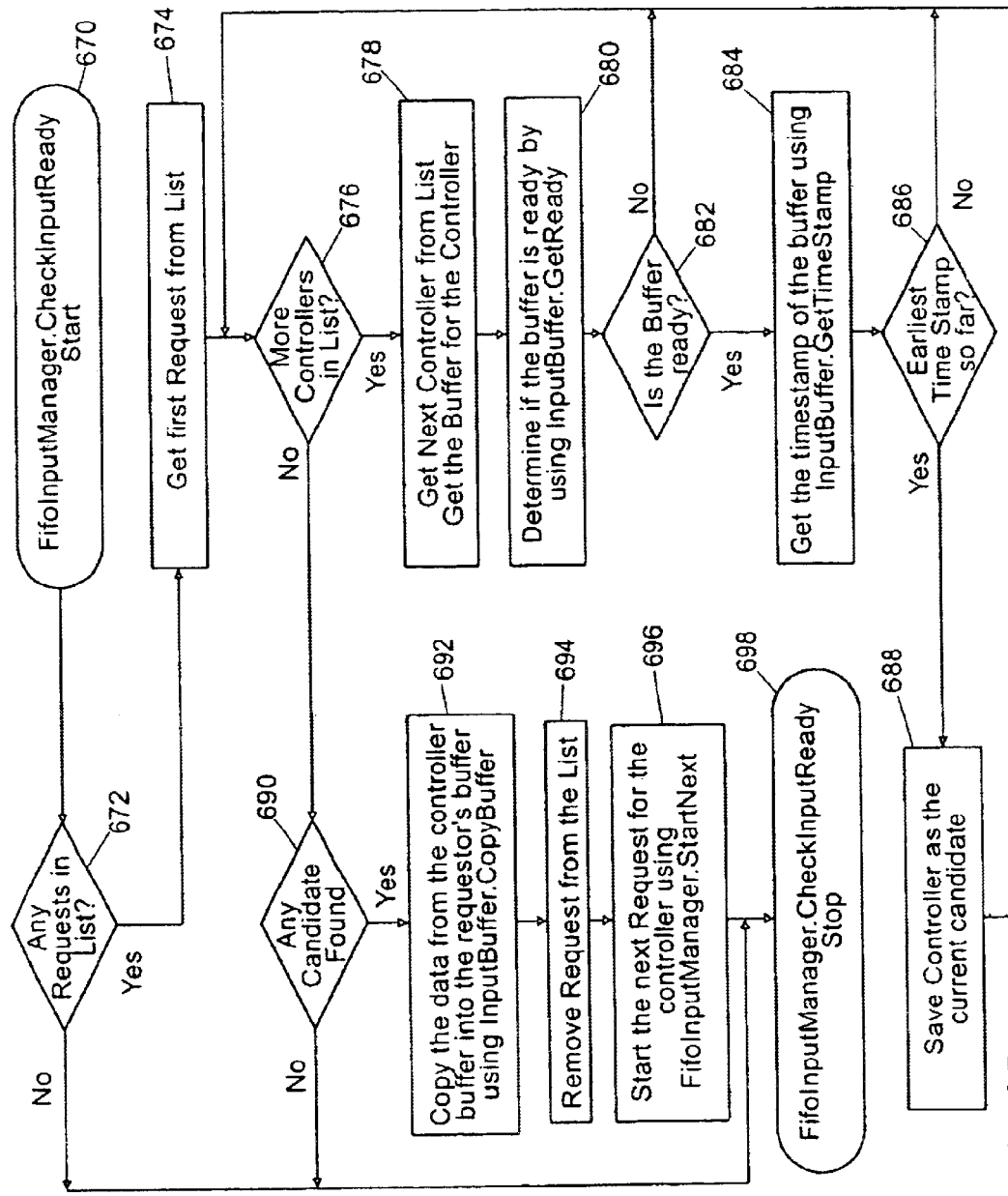
FIG. 15 illustrates a process for handling inputs for a Fifo input manager.

Turning now to FIG. 15, one implementation of a FifoInputManager.CheckInputReady function 670 is shown. First, the process checks whether any requests are pending on the list (step 672). If so, the first request is obtained from the list (step 674). Next, the process of FIG. 15 checks whether additional controllers need to be handled (step 676). If so, the next controller is retrieved from the list and a buffer is assigned for the controller (step 678). The process then determines whether the buffer is ready using an InputBuffer.GetReady function (step 680). Further, the buffer ready status is checked (step 682). If ready, the process obtains a timestamp on the buffer using an InputBuffer.GetTimeStamp function (step 684). Additionally, the process checks whether or not the current timestamp is the earliest timestamp so far (step 686). If so, the current controller is saved as the current candidate (step 688). From step 682, 686 or 688, the process of FIG. 15 loops back to step 676 to continue processing the controllers in the list. From step 676, in the event that all controllers have been processed, the process of FIG. 15 proceeds to step 690 where it checks whether any candidate has been found. If not, the process exits (step 698). Alternatively, if a candidate has been located, the process of FIG. 15 copies data from a controller buffer into the request buffer using an InputBuffer.CopyBuffer function (step 692). Further, the process removes the request from the list (step 694) and starts the next request for the controller using a FifoInputManager.StartNext function (step 696) before exiting (step 698).

Figure 16:
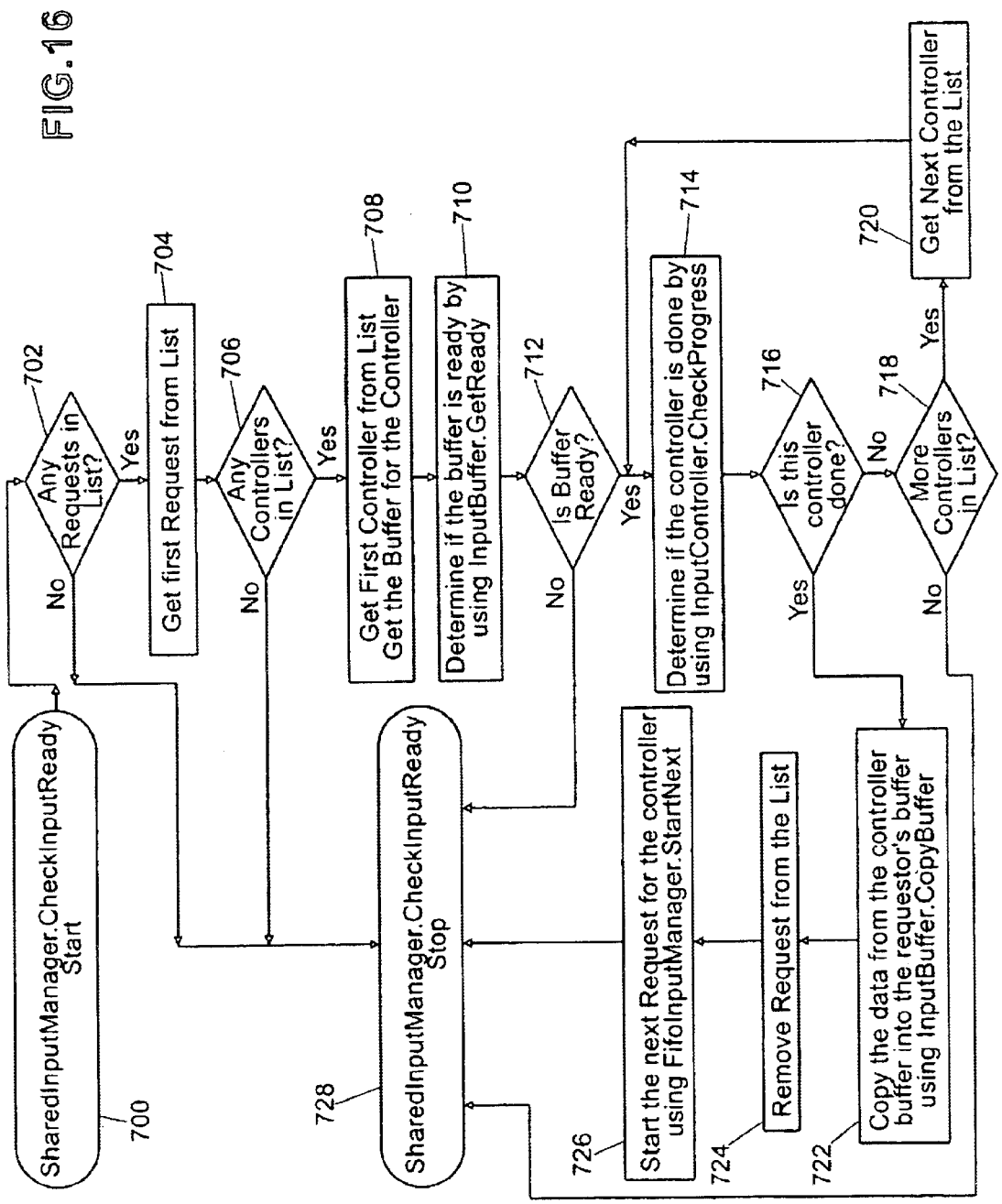
FIG. 16 is a process for handling inputs for a shared input manager.

Referring now to FIG. 16, one implementation of a SharedInputManager.CheckInputReady process 700 is shown. The process first checks whether any requests remain in the list (step 702). If so, the first request is retrieved from the list (step 704). Further, the process determines whether any controllers remain in the list (step 706). If so, the first controller is obtained from the list and a buffer is assigned for the controller (step 708). Further, the process determines whether the buffer is ready using InputBuffer.GetReady (step 710). Further, the buffer's status is checked (step 712). If the buffer is ready, the process determines whether the controller has completed its operation using an InputController.CheckInProgress function (step 714). In step 716, the process of FIG. 16 determines whether the controller is done with the data capture. If not, the process determines whether additional controller remain on the list (step 718). If so, the next controller is obtained from the list (step 720) and the process loops back to step 714 to continue processing the next controller. From step 716, in the event that the controller is done, the process copies data from the controller buffer into the request buffer using an InputBuffer.CopyBuffer function (step 722). Further, the process removes the request from the list (step 724) and starts the next request for the controller using a FifoInputManager.StartNext function (step 726) before exiting (step 728). Step 728 is also reached from step 702, 706 and 712.

Figure 17:
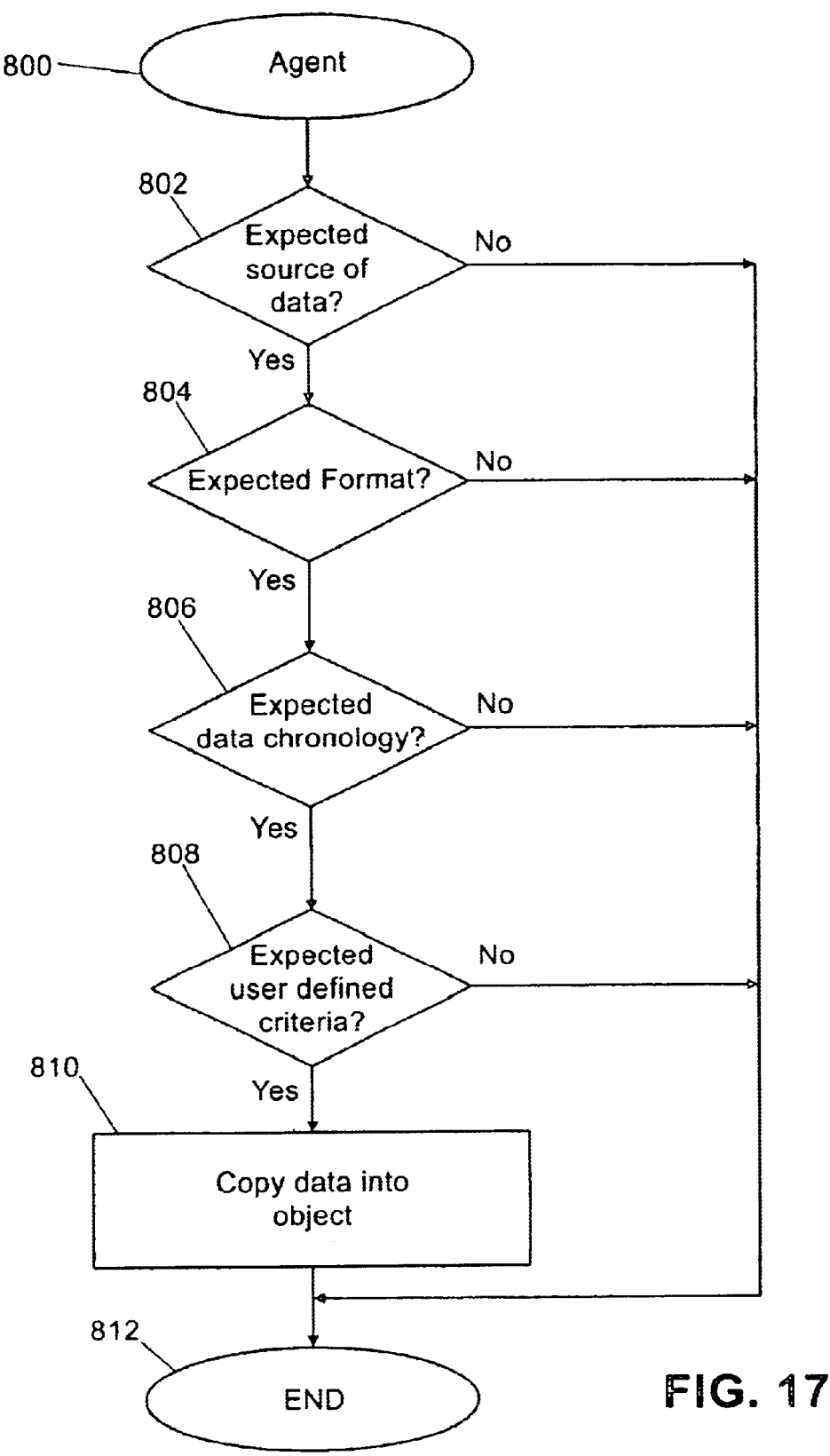
FIG. 17 illustrates a flow chart illustrating the operation of an agent for handling data.

FIG. 17 shows one implementation of an agent process 800 for analyzing and inserting data into the appropriate field in the form. The process 800 initially checks whether the source of the data in the data pipe matches the expected data source (step 802). If so, other characteristics associated with the data is checked. Thus, in step 804, the process 800 checks to see if the format of the data is as expected. If so, the process 800 further checks whether or not the chronology of the data is as expected (step 806). Finally, the process 800 checks whether or not characteristics associated with the data match one or more user-defined criteria (step 808). If these characteristics match, the data is copied into the objects (step 810). Alternatively, if there is a variance in the characteristic in steps 802, 804, 806, or 808, the process 800 simply exits (step 812).

As discussed above, the invention provides data from one or more input sources through the operating system to the application software with one or more data fields by packaging data and an identification of the input source of the data as an entity, said entity being associated with a predetermined data entry field in the application software; sending the entity to the application software; and associating the entity to the predetermined data entry field based on said identification.

The identification information for each entity may provide an indication of the source of input data, such as a keyboard, a pen, a voice capture unit, a camera, an electromagnetic force interference detector, and a database server. The identification information for an entity may also include indications of the conditions under which the data was input, such as the time, position, temperature, humidity, or indications of the past history of data flow through the system. Moreover, the packaging for an entity may be in the form of a data object with associated processing methods, and where a facility exists for concurrently managing a plurality of said data objects. The application software may also use a plurality of forms, wherein each form may consist of a plurality of form objects, the form objects collectively describing the data input requirements of said form. The form object may be represented by an input requestor and may possess a plurality of selection criteria, and wherein said selection criteria specify the conditions which must hold for a data object produced by an input source to satisfy the requirements of said form object. The selection criteria of a form object may be based on the content of the input data, the format of the input data, the identification information associated with the input data, or any combination thereof. Further, the processing or transfer details of a data object required to satisfy a form object may be accomplished transparently to the form object. Further, the processing and transfer of a data object may involve operation sequencing, data translation, process synchronization, content filtering, or path routing. The processing and transfer of a data object may be accomplished by or in conjunction with an operating system, such as Windows CE or Java OS. The processing and transfer of data may be accomplished using a data exchange mechanism such as Dynamic Data Exchange (DDE), Component Object Model (COM), Object Linking and Embedding (OLE), Distributed Component Object Model (DCOM), or Common Object Broker Remote Access (COBRA). The association and integration of form objects with data objects may be accomplished using component object technology such as Active-X controls or Java Beans. The form objects may be located within a plurality of forms, wherein said forms may exist within a plurality of applications, and wherein said applications may be executed on a plurality of computing systems, such as on a network.

The invention provides a convenient environment, for seamlessly handling data input from a wide variety of input sources. Additionally, the invention allows multiple input sources to be used by one or more applications without regard to knowledge of the details of device control, operation sequencing, data translation, process synchronization, content filtering, or path routing. Moreover, the invention allows a robust integration of data between application programs and the operating system. The user no longer needs to physically perform the data transfer function or to develop custom handler software for the data. Once specified in a form, date is dynamically placed into its destination field on the form. Moreover, the invention performs the data placement without requiring rigid rules and custom controls for each field. Thus, the invention supports an environment which automatically places data entry, including magnetic stripe reader data, pen stroke data, voice data, image data and video sequence data into one or more predetermined fields.

The invention also provides a simple application development across a multitude of operating systems and environments. For instance, when the operating system is a Microsoft Windows system, the application program may acquire data through objects with embedded data and with location information associated with the data. The application program and the data objects also receive information from an insert menu resource which is created with a moniker. Associated with each moniker is a verb defining an action to be executed or performed with reference to the embedded data and the location information. An object linking and embedding mechanism provides the data through a data exchange mechanism 654 such as dynamic data exchange (DDE), object linking and embedding (OLE) and the automation support provided in OLE for the data objects. Data is then supplied to the appropriate field.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Each program is preferably implemented in a high level procedural or object-oriented programming language to communicate with a computer system. However, the programs may be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium is configured to cause a computer to operate in a specific and predefined manner.

What is claimed is:

1. A method for transferring data from a bar code reader to a software application having one or more data field, including the steps of:
    storing data from a bar code reader in an entity wherein said entity is a data object;
    storing identification information regarding the bar code reader of the data in said entity;
    transferring said entity to the software application wherein said transferring includes operations chosen from the group consisting of operation sequencing, data translation, process synchronization, content filtering, and path routing; and
    associating said entity with a data field in the software application based on said identification information.

2. The method of claim 1, further including the step of:
    forming a data object from said entity.

3. The method of claim 2 wherein the software application includes one or more forms, each of said forms designed to receive one or more form objects, each of said form objects containing a data selection criteria.

4. The method of claim 3, wherein said transferring step includes the step of:
    routing said data object to one of said form objects, said form object chosen based on said data selection criteria and said identification information.

5. The method of claim 3, wherein said form objects associated with a specific form collectively describe the data input requirements for said form.

6. The method of claim 1, wherein said identification information includes information chosen from the group consisting of time, position, temperature, humidity, and indications of the past history of data flow through the system.

7. The method of claim 3, wherein the software application further includes one or more input requestors, each of said forms associated with one of said input requestors.

8. The method of claim 3, wherein said selection criteria specifies conditions for using said data object to satisfy the input requirements of one of said form objects.

9. The method of claim 3, wherein said selection criteria is based on information chosen from the group consisting of the content of the data, the format of the data, and said identification information.

10. The method of claim 3, further including the step of processing the data in said data object.

11. The method of claim 10, wherein the processing details of said data object are not known to the form object.

12. The method of claim 1, wherein said transferring step is performed by an operating system.

13. The method of claim 1, wherein said transferring step further includes the step of:
    sending the data to a data exchange mechanism.

14. The method of claim 13, wherein said data exchange mechanism is chosen from a set consisting of a dynamic Data exchange (DDE), a component object model (COM), an object linking and embedding (OLE), a distributed component object model (DCOM) and a common object broker remote access (COBRA).

15. The method of claim 1 wherein said transferring step is accomplished using component objects.

16. A computer system for transferring data from a bar code reader to a software application having one or more data fields, including:
    a memory writer which stores the data from the bar code reader in an entity and stores identification information regarding the bar code reader of the data in said entity wherein said entity is a data object and wherein said identification information includes information chosen from the group consisting of time, position, temperature, humidity, and indications of past history of data flow through the system;
    a sender which transfers said entity to the software application; and
    a matcher which associates said entity with a data field in the software application based on said identification information.

17. The computer system of claim 16 further including:
    an entity modifier which forms a data object of said entity.

18. The computer system of claim 16, wherein the software application further includes one or more forms, each of said forms designed to receive one or more form objects containing a data selection criteria.

19. The computer system of claim 18, wherein said sender includes:
    a router which routes said data object to one of said form objects, said form object chosen based on said data selection criteria and said identification information.

20. The computer system of claim 18, wherein said form objects associated with a specific form collectively describe the data input requirements of said form.

21. The computer system of claim 18, wherein the software application further includes one or more input requestors, each of said form objects associated with one of said input requestors.

22. The computer system of claim 18, wherein said selection criteria specifies conditions for using said data object to satisfy the input requirements of one of said form objects.

23. The computer system of claim 18, wherein said selection criteria is based on information chosen from the group consisting of the content of the data, the format of the data, and said identification information.

24. The computer system of claim 18, further including a processor which processes the data in said data object.

25. The computer system of claim 24, wherein the processing details of said data object are not known to said form object.

26. The computer system of claim 16, wherein said sender is contained within an operating system.

27. The method of claim 16 wherein said sender transfers the data to a data exchange mechanism.

28. The computer system of claim 27, wherein said data exchange mechanism is chosen from the set consisting of a dynamic data exchange (DDE), a component object model (COM), object linking and embedding (OLE), a distributed component object model (DCOM), and a common object broker remote access (COBRA).

29. The computer system of claim 16 wherein said sender:
    performs operations chosen from a group consisting of operation sequencing, data translation, process synchronization content filtering, and path routing.

30. The computer system of claim 16, wherein said sender:
    transfers said entity to the software application using component objects.

* * * * *